United States Patent
Polega et al.

(10) Patent No.: US 10,095,682 B2
(45) Date of Patent: Oct. 9, 2018

(54) DETERMINING INCIDENT CODES USING A DECISION TREE

(71) Applicant: Mark43, Inc., New York, NY (US)

(72) Inventors: Matthew Polega, New York, NY (US); Scott Crouch, New York, NY (US); Florian Mayr, Wainfleet (CA); Stephen Okano, New York, NY (US); Alden Quimby, Boston, MA (US); Matthew Dean, Brooklyn, NY (US)

(73) Assignee: Mark43, Inc., New York, NY (US)

( * ) Notice: Subject to any disclaimer, the term of this patent is extended or adjusted under 35 U.S.C. 154(b) by 51 days.

(21) Appl. No.: 15/157,912

(22) Filed: May 18, 2016

(65) Prior Publication Data

US 2017/0031891 A1 Feb. 2, 2017

Related U.S. Application Data

(60) Provisional application No. 62/198,363, filed on Jul. 29, 2015.

(51) Int. Cl.
| | |
|---|---|
| *G06N 99/00* | (2010.01) |
| *G06F 17/24* | (2006.01) |
| *G06F 3/0484* | (2013.01) |
| *G06Q 50/26* | (2012.01) |
| *G06T 11/20* | (2006.01) |
| *G06T 11/60* | (2006.01) |

(52) U.S. Cl.
CPC .......... *G06F 17/248* (2013.01); *G06F 3/0484* (2013.01); *G06F 17/246* (2013.01); *G06N 99/005* (2013.01); *G06Q 50/26* (2013.01); *G06T 11/206* (2013.01); *G06T 11/60* (2013.01)

(58) Field of Classification Search
CPC .... G06F 17/248; G06F 17/246; G06F 17/211; G06F 17/30554; G06F 3/0484; G06N 99/005; G06Q 50/26; G06T 11/206; G06T 11/60
USPC ........................................................ 715/215
See application file for complete search history.

(56) References Cited

U.S. PATENT DOCUMENTS

| | | | |
|---|---|---|---|
| 6,704,719 B1 * | 3/2004 | Ericson ................ | G06K 9/6282 706/48 |
| 2003/0195775 A1 * | 10/2003 | Hampton ............... | G06Q 10/10 705/3 |
| 2005/0181386 A1 | 8/2005 | Diamond et al. | |

(Continued)

OTHER PUBLICATIONS

International Search report for International Application No. PCT/US16/33242 dated Aug. 26, 2016, 7 pages.

*Primary Examiner* — Scott T Baderman
*Assistant Examiner* — Hassan Mrabi
(74) *Attorney, Agent, or Firm* — Lowenstein Sandler LLP (57) ABSTRACT

A processing device receives a request to create a report. The processing device generates one or more questions pertaining to a decision tree, the decision tree linking one or more attributes to one or more corresponding incident codes. The processing device displays one or more answers corresponding to the one or more questions. The processing device utilizes the one or more answers to traverse the decision tree to arrive at more questions. Responsive to the processing device determining that the traversal of the decision tree results in an arrival at an incident code, the processing device generate a report template using the determined incident code.

20 Claims, 6 Drawing Sheets

(56) References Cited

U.S. PATENT DOCUMENTS

| | | | | |
|---|---|---|---|---|
| 2009/0226872 A1* | 9/2009 | Gunther | ............... | G09B 7/00 |
| | | | | 434/350 |
| 2011/0264617 A1* | 10/2011 | Eggers | ............. | G06F 17/30598 |
| | | | | 706/50 |
| 2011/0288869 A1* | 11/2011 | Menendez-Pidal | ......................... | |
| | | | | G10L 15/144 |
| | | | | 704/256.1 |
| 2012/0101852 A1* | 4/2012 | Albert | ............... | G06Q 40/08 |
| | | | | 705/4 |
| 2012/0166212 A1* | 6/2012 | Campbell | ............. | G06Q 50/22 |
| | | | | 705/2 |
| 2013/0304676 A1* | 11/2013 | Gupta | ............... | G06N 5/043 |
| | | | | 706/12 |
| 2014/0213212 A1 | 7/2014 | Clawson | | |
| 2014/0278664 A1 | 9/2014 | Loomis | | |
| 2014/0344208 A1* | 11/2014 | Ghasemzadeh | ........ | G16H 50/50 |
| | | | | 706/52 |
| 2014/0358720 A1* | 12/2014 | Morales | ............. | G06Q 30/0631 |
| | | | | 705/26.7 |

\* cited by examiner

FIRST CELL OF EACH ROW REPRESENTS A UNIFORM/NATIONAL CODE; SECOND CELL REPRESENTS A LOCAL CODE; THIRD CELL REPRESENTS UNIFROM/NATIONAL NAME; FOURTH CELL REPRESENT LOCAL NAME
310

EACH COLUMN HEADER REPRESENTS A CODE ATTRIBUTE/TRAIT (E.G., VIOLENT, FINE INVOLVED, ETC.)
320

UNIQUE ANSWERS IN EACH COLUMN BECOME POSSIBLE "VALUES" FOR ATTRIBUTE
330

EACH ROW IS DEFINED BY A UNIFORM/NATIONAL AND LOCAL CODE FOR AN INCIDENT
340

MAP ANY COMBINATION OF LOCAL CODES TO ANY COMBINATION OF UNIFORM/NATIONAL CODES
350

DETERMINING INCIDENT CODES USING A DECISION TREE

CROSS-REFERENCE TO RELATED APPLICATIONS

This application claims the benefit of U.S. provisional patent application No. 62/198,363 filed Jul. 29, 2015, the disclosure of which is incorporated herein by reference in its entirety.

TECHNICAL FIELD

The invention relates to a system and method for law enforcement to arrive quickly at selecting a correct law enforcement incident code for an incident to be reported in a records management system (RMS).

BACKGROUND

One responsibility of law enforcement officers is to detail incidents to which they have responded. For example, when an officer has to report to an incident, he or she must document the incident and associated information in the form of a report. A records management system (RMS) can be used by the law enforcements officers to assist in detailing incidents via a report. RMS systems typically rely on incident codes to define and categorize types of incidents. However, with existing incident code-selection processes, there is no system to help coach users through the thousands of possible codes that correspond to an incident. This leads to extra time being spent looking for codes, inaccurate code selection, and poor data quality.

BRIEF DESCRIPTION OF THE DRAWINGS

The present invention will be more readily understood from the detailed description of exemplary embodiments considered in conjunction with the following drawings, of which.

DETAILED DESCRIPTION

Implementations of the disclosure provide for determining incident codes using a decision tree. The decision tree may be any one of a number of tree structures including, but not limited to, a binary tree, a ternary tree, etc. In one implementation, a decision tree used to identify a specific type of law enforcement incident would best used in a law enforcement records management system (RMS). RMS's are used by most law enforcement officers. When an officer has to report to an incident, they must document the incident and associated information in the form of a report. They use an RMS to accomplish this. Instead of needing to select an incident code from a large dictionary, the officer would begin the report-writing process by entering the decision tree and following the prompts to identify the exact code for whatever incident took place. Once the officer determined the exact incident code, they would then be supplied with the exact report requirements and data fields. Officers are often presented with a surplus of report requirements, many of which are not applicable to the incident. Not only would the addition of a decision tree to determine incidents to an RMS system reduce the time officers spent on reporting, but it would also improve the accuracy of the report data.

One of the most significant shortcomings in trying to determine incident codes is that most methods of determination are static and do not aid users through the thousands of possible codes that correspond to an incident. This leads to extra time being spent looking for codes, inaccurate code selection, and poor data quality.

One previous solution for determining incident codes related to an incident is a straight database look-up. A user (e.g., a law enforcement office, administrator, attorney, or any other user) looked up codes in some sort of dictionary, confirmed that the code definition matches the incident code, and entered it in something like a text box (or select from a drop-down menu). In other instances, users are simply presented with a long list of possible codes and then they select the related code based on memory and intuition. The previous solutions for determining incident codes, such as those described above, provide no process to help users parse through the thousands of possible codes that could correspond with an incident.

Figure 1:
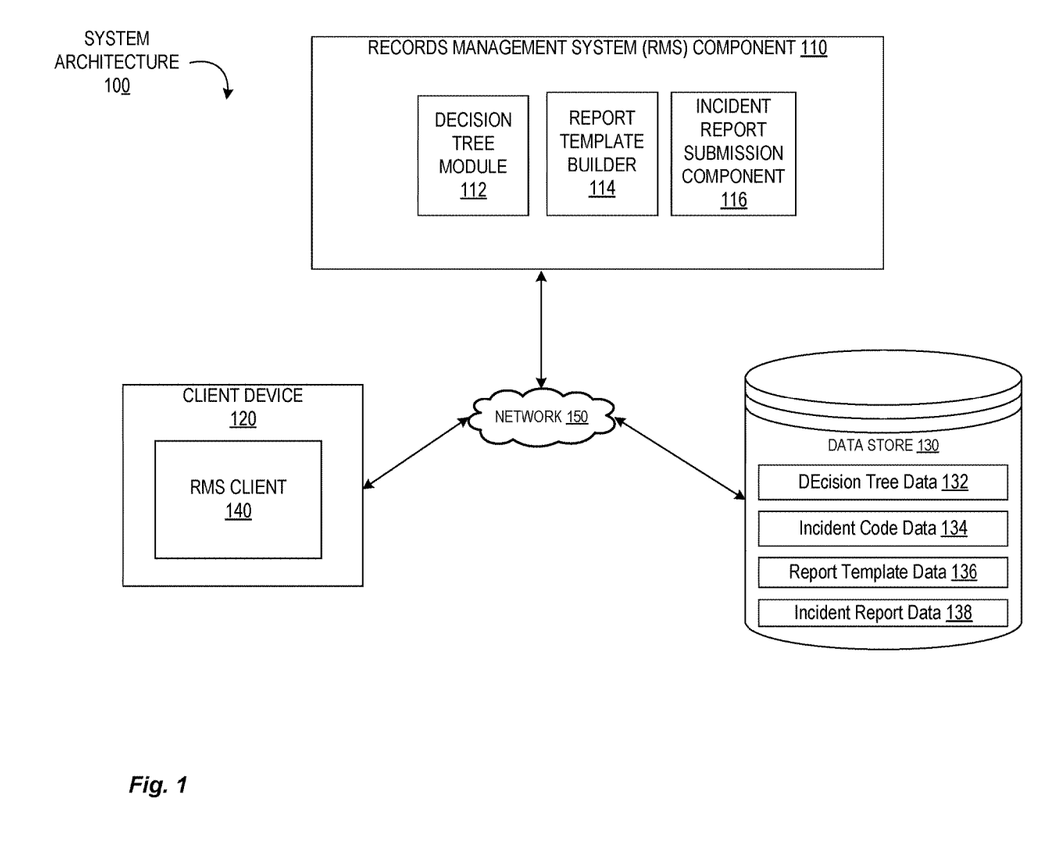
FIG. 1 illustrates an example system architecture for determining incident codes using a decision tree.

FIG. 1 illustrates an example system architecture 100 for determining incident codes using a decision tree. The system architecture 100 includes a records management system (RMS) component 110, a client device 120, a data store 130, and a network 150. In one embodiment, network 150 may include one or more of a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one embodiment, the data store 130 may be may be a memory (e.g., random access memory), a cache, a drive (e.g., a hard drive), a flash drive, a database system, or another type of component or device capable of storing data. The data store 130 may also include multiple storage components (e.g., multiple drives or multiple databases) that may also span multiple computing devices (e.g., multiple server computers).

In one embodiment, the RMS component 110 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that manages and assists in generating incident reports, including determining incident codes for the reports using a decision tree. For example, the RMS component 110 may be part of a law enforcement platform that is used to enter and maintain incident reports of the law enforcement organization. In other implementations, organizations other than law enforcement may utilize the decision tree of implementations of the disclosure in order to classify codes and improve a code selection process. In some implementations, incident data may be entered into and monitored by RMS component 110 via an RMS client 140 at client device 120.

Client device 120 may be any type of computing device including server computers, gateway computers, desktop computers, laptop computers, mobile communications devices, cell phones, smart phones, hand-held computers, tablets, or similar computing devices. The client device 140 may be configured with different features to enable viewing of visual content, such as images, videos, etc.

In one implementation, the RMS component 110 includes a decision tree module 112, a report template builder 114, and an incident report submission component 116. This arrangement of components and/or modules may be a logical separation, and in other implementations, these modules or other components can be combined together or separated in further components, according to a particular implementation. Other components and/or modules in addition to those described herein may also be included in implementations of the disclosure.

The decision tree module 112 of RMS component 110 implements a decision tree to identify a specific type of law enforcement incident code. A user of the RMS component 110 would begin the report-writing process by entering the decision tree (e.g., via RMS client 140) and following the prompts to identify an exact code for whatever incident took place. Once the user determines the exact incident code, he or she would then be supplied with the exact report requirements and data fields by report template builder 114. In some implementations, different report templates may be stored as report template data 136 of data store 130. Incident report submission component 116 can then be used to submit the incident report. The incident report may be stored as incident report data 138 in data store 130.

Use of a decision tree in the RMS component 110 to determine incidents codes can reduce the time users spend on reporting, and also improve the accuracy of the report data. Furthermore, the use of the decision tree optimizes a law enforcement organization's adherence to crime reporting standards (such as the FBI's Uniform Crime Reporting (UCR) standard or the FBI's National Incident Based Reporting Standard (NIBRS)) by building the crime code (e.g., UCR crime code) into the decision tree even if the local offense code does not map directly to any of the crime codes.

In implementations of the disclosure, each specific code (e.g., stored as incident code data 134 of data store 130) is characterized by a set of unique characteristics. For example, a list of traits for a homicide with a deadly weapon may look like this: [violent: yes, weapon involved: yes, trespassing: no, sexual: no, malicious intent: yes]. Each incident code has a unique set of traits that differentiate it from all other codes. By analyzing common characteristics across codes, the decision tree module 112 can divide the codes into different groups that allow the user to arrive at a conclusion most quickly.

For example, crimes are generally either violent or nonviolent, so we organize all of the codes into two groups: violent and nonviolent. The decision tree module 112 can ask the user whether the crime was violent or nonviolent, and based on the answer, can stop considering the opposing group. For example, if the user said the crime was violent, the decision tree module 112 could disregard all crimes that are considered nonviolent. The decision tree module 112 then continues to parse through the possible violent crimes using a similar method. The decision tree module 112 continues this process until a decision tree (e.g., stored as decision tree data 132 in data store 130) is built that maps the questions and answers that show how to most quickly arrive at a single incident node on the tree (a leaf node).

Implementations of the disclosure speed up the code (e.g., incident code) selection process for a few reasons. Firstly, users do not have to know the characteristics of the crime immediately. Instead, they are asked simple questions to eventually divine the correct code from the global set of possible codes. This greatly reduces coding inaccuracy and makes the process much less intimidating for the officer. Secondly, an altered form of Kullback-Leibler convergence may be used to mostly quickly arrive at the final code. This process predicts which questions allow the user to reach a conclusion most quickly. Finally, the user can answer "I don't know" to some of the questions and the decision tree module 112 recalculates the question tree to route the user through different questions (but still arrive at the same answer). In one embodiment, recalculating the question tree to route the user through different questions does not discard possible codes. Ultimately, this process allows the decision tree module 112 to analyze a sparse data set and most efficiently divide codes into groups that quickly help the user arrive at their conclusive code.

Implementations of the disclosure improve over previous solutions for code selection for a variety of reasons. First, implementations of the disclosure provide guided direction for determining an incident code. Existing systems either rely on dictionary lookup or memorization by an officer. Implementations of the disclosure utilize a system of very basic questions to determine attributes about the incident and disregard all other incidents with conflicting attributes. Rather than selecting a code from thousands of options, a user answers a short series of simple questions.

Second, implementations of the disclosure use Kullback-Leibler divergence to most quickly arrive at the final incident code. Known as information gain, this technique allows for organization of codes in a shallow decision tree that helps a user to find an incident code in the most efficient manner possible.

Third, implementations of the disclosure provide an ability to support sparse datasets. Many attributes related to one incident don't relate to other crimes. For example, "property value" would apply to burglary but not homicide, while "intersection or street" would apply to a traffic crash but not a sex crime. The RMS component 110 with decision tree module 112 account for these irregularities and adjust the Kullback-Leibler algorithm accordingly. In some implementations, the RMS component 110 may prompt a user to select a local department code first and a uniform (e.g., national) code last. In other implementations, either code could be selected in any order, and/or at the same time.

Lastly, implementations of the disclosure are generalizable. The RMS component 110 does not utilize any specific type of code or format. This can be used with any organization's code set and any other code set to which the organization's code set corresponds.

In one implementation, an example use case for the RMS component 110 may be as follows in the case of a law enforcement officer. First, an officer reports to the scene of a crime and gathers notes about what took place. For this example, the officer notes that (a) the crime was not violent, (b) involved stolen property, (c) did not involve unlawfully entering somebody's home or business (trespassing), and (d) involved the forcible taking of property from a victim. Then, the officer returns to their computer terminal (e.g., client device 120) at their department and opens their RMS client (e.g., RMS client 140). The officer indicates that they would like to open an incident report. To determine the proper fields to fill out (some fields correspond only to a handful of crimes) and the proper report, the officer indicates that they would like to use the decision tree to identify the criminal code.

The decision tree module 112 of RMS component 110 is then invoked (e.g., via network 150 communication between RMS client 140 and RMS component 110). The decision tree module 112 first asks the officer, "Was it violent?" Because it was not, the decision tree module 112 can now remove all violent incident codes from consideration. The decision tree module 112 then queries the officer, "Did the incident involve stolen property?" Because there was stolen property involved, the decision tree module 112 now only considers non-violent incident that involved stolen property. Subsequently, the decision tree module 112 queries the officer, "Did the offender trespass?" Because the offender did not trespass, the decision tree module 112 now only considers non-violent incidents, non-trespassing incidents that involved stolen property.

The decision tree module 112 then asks the officer, "Was the property forcibly taken from the victim?" Because the property was forcibly taken from the victim, the decision tree module 112, which was only considering non-violent incidents and non-trespassing incidents that involved stolen property, can determine that the incident type was a robbery (vs. a burglary or simple theft). The decision tree module 112 passes the determined incident code onto the report template builder, which then causes a specifically-tailored robbery report template to be displayed to the user at client device 120. The officer may then fill out and submits the robbery report template via incident report submission component 116.

Figure 2:
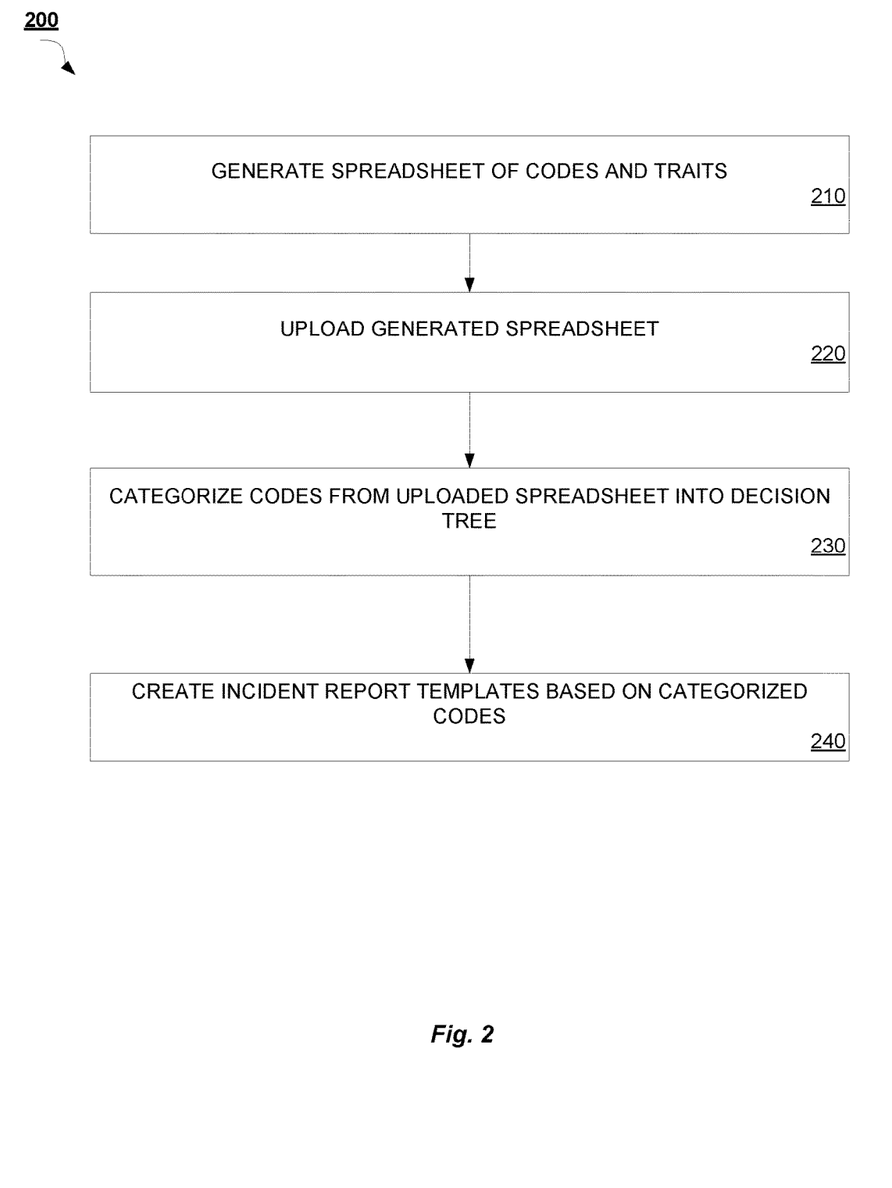
FIG. 2 is a flow diagram illustrating a method for categorizing incident codes into a decision tree.

FIG. 2 is a flow diagram illustrating a method 200 for categorizing incident codes into a decision tree. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by RMS component 110 of FIG. 1.

Method 200 begins at block 210 where a spreadsheet is generated including codes and attributes/traits. Further description of generation of the spreadsheet may be found below with respect to method 300 of FIG. 3. At block 220, the generated spreadsheet is uploaded. At block 230, codes from the uploaded spreadsheet are categorized into a decision tree. Further description of categorizing codes into a decision tree may be found below with respect to method 400 of FIG. 4. Lastly, at block 240, incident report templates are created based on the categorized codes in the decision tree.

Figure 3:
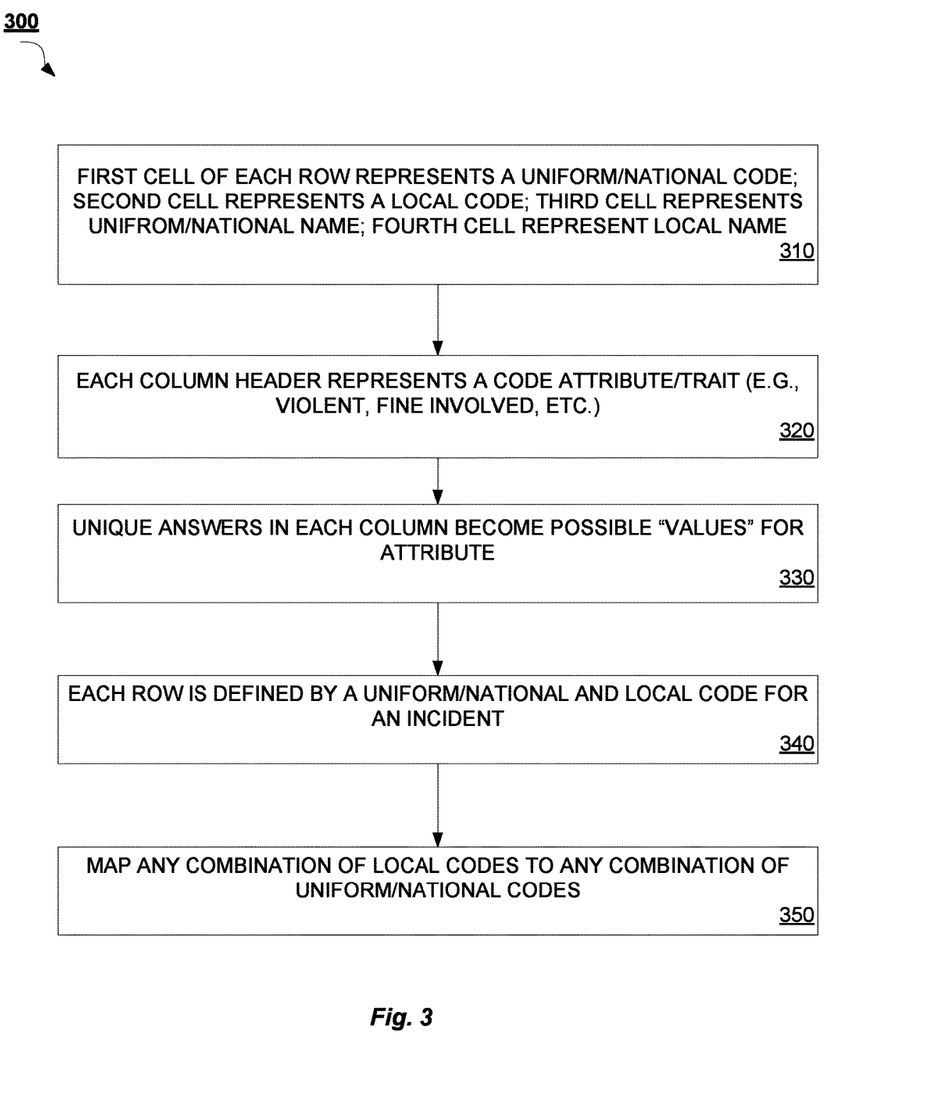
FIG. 3 is a flow diagram illustrating a method for generated a spreadsheet for using in creating a decision tree for determining incident codes.

FIG. 3 is a flow diagram illustrating a method 300 for generated a spreadsheet for using in creating a decision tree for determining incident codes. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by RMS component 110 of FIG. 1.

Method 300 begins at block 310 where a first cell of each row in the spreadsheet represents a uniform or national code, the second cell represents a local (e.g., departmental) code, the third cell represents a corresponding uniform or national code name, and the fourth cell represents a corresponding local code name. At block 320, each column header in the spreadsheet represents an attribute/trait. In one implementation, the attribute/trait may include, but is not limited to, violent, non-violent, fine involved, etc.

At block 330, unique answers in each column become possible values for the attribute. Then, at block 340, each row in the spreadsheet is defined by a uniform/national code and a local code for an incident. Lastly, at block 350, any combination of local codes is mapped to any combination of uniform/national codes.

Figure 4:
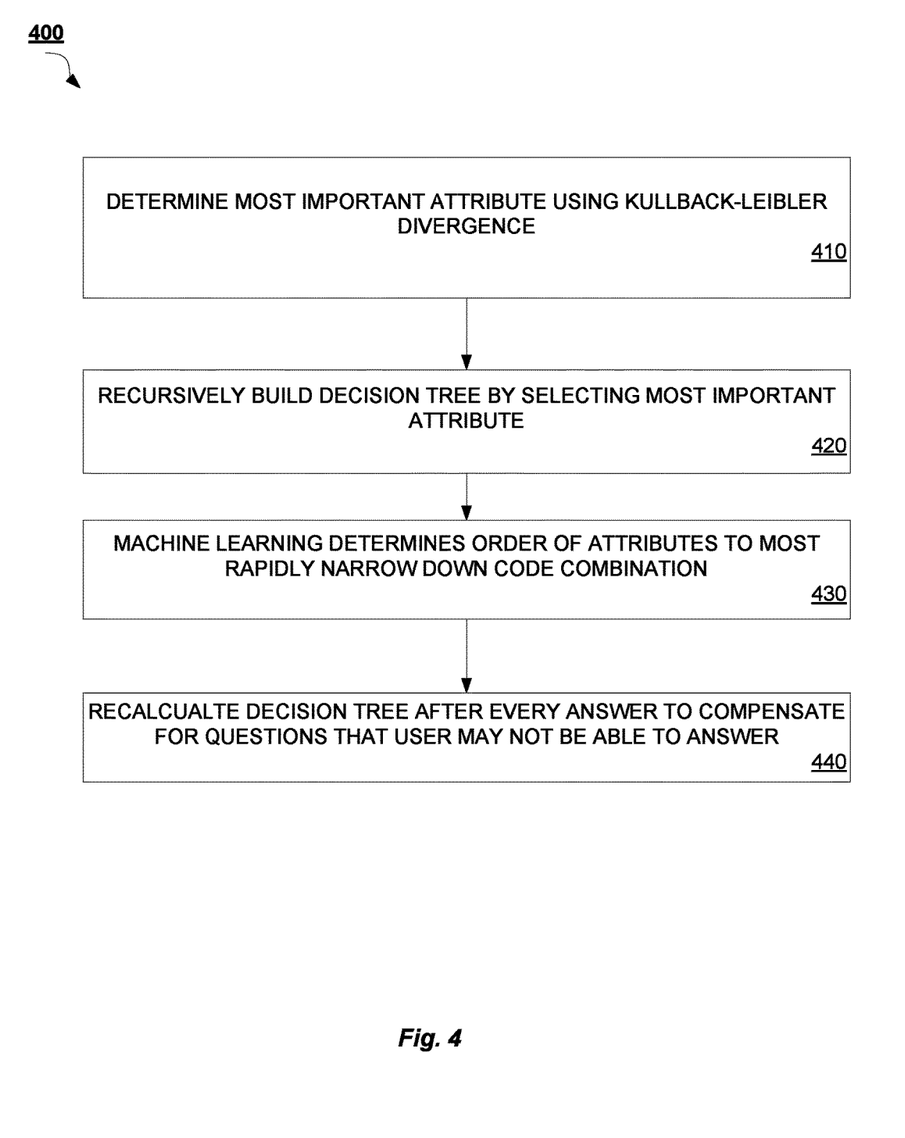
FIG. 4 is a flow diagram illustrating a method for categorizing codes into a decision tree.

FIG. 4 is a flow diagram illustrating a method 400 for categorizing codes into a decision tree. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by RMS component 110 of FIG. 1.

Method 400 begins at block 410 where a most important attribute (e.g., of set of attributes in a row of an uploaded spreadsheet of codes) is determined using, for example, a Kullback-Leibler divergence technique. In one implementation, a most divisive attribute may be determined. This most divisive attribute may provide evenly-divisive answers to eliminate a large number of data elements in a data set. If the question had more options for answers, and an uneven distribution of codes relating to those codes, the likelihood of discarding codes is not very large. In other implementations, different techniques may be utilized to determine the attribute.

At block 420, a decision tree is built by recursively selecting the most important attribute at block 410. At block 430, an order of attributes is determined via machine learning. This order rapidly narrows down code combinations. Lastly, at block 440, the decision tree is recalculated after every answer to compensate for questions that a user may not be able to answer. Implementations of the disclosure perform this recalculation because data may be sparse and codes should not be ruled out when they do not apply to a current question.

Figure 5:
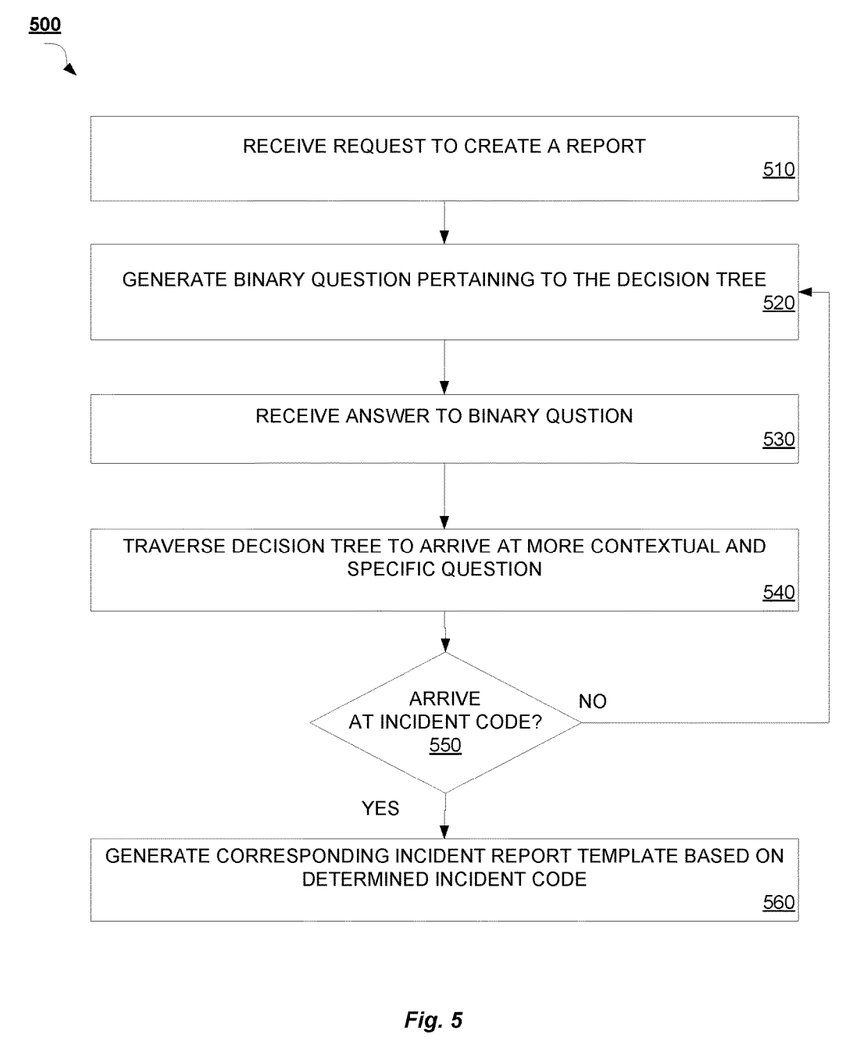
FIG. 5 is a flow diagram illustrating a method for determining incident codes using a decision tree.

FIG. 5 is a flow diagram illustrating a method 500 for determining incident codes using a decision tree. Method 500 may be performed by processing logic that may comprise hardware (e.g., circuitry, dedicated logic, programmable logic, microcode, etc.), software (such as instructions run on a processing device), firmware, or a combination thereof. In one embodiment, method 500 is performed by RMS component 110 of FIG. 1.

Method 500 begins at block 510 where a request to create a report is received. Then, at block 520, a binary question pertaining to a decision tree is generated. Then, at block 530, an answer to the binary questions is received. In one implementation, a user of the RMS component provides the answer to the binary question. At block 540, the decision tree is traversed to arrive at a more contextual and specific question.

Subsequently, at block 550, it is determined whether the traversal of the decision tree resulted in arrival at an incident code. If not, then method 500 returns to block 520 to generate the next binary question. In one example, blocks 520-540 are repeated until an incident code is arrived at, or the tree produces no incident code. On the other hand, if an incident code is present, then method 500 proceeds to block 560 where a corresponding incident report template is generated based on the determined incident code.

Figure 6:
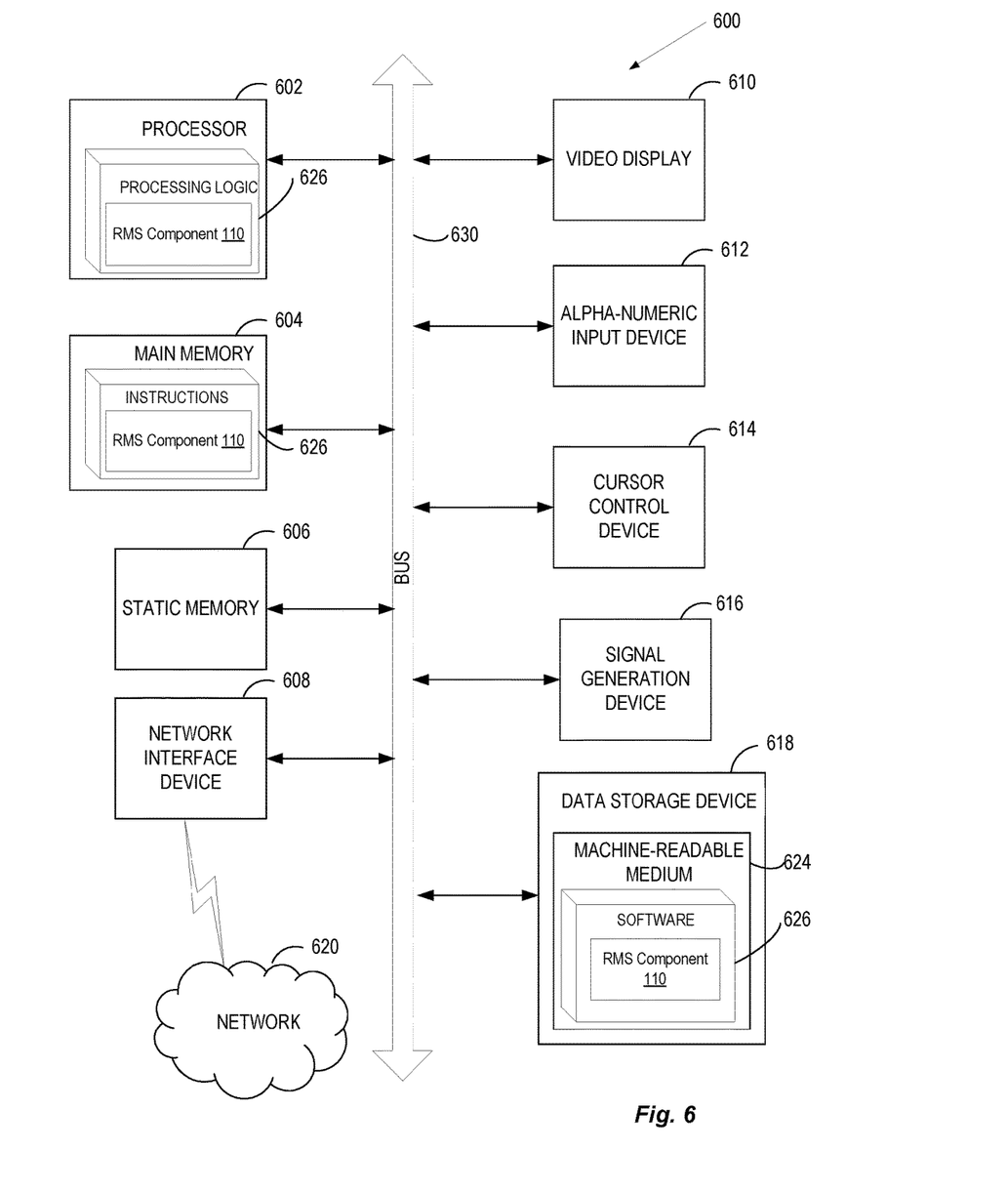
FIG. 6 illustrates a diagrammatic representation of a machine in the example form of a computer system within which a set of instructions, for causing the machine to perform any one or more of the methodologies discussed herein, may be executed.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 600 includes a processing device 602, a main memory 604 (e.g., read-only memory (ROM), flash memory, dynamic random access memory (DRAM) (such as synchronous DRAM (SDRAM) or DRAM (RDRAM), etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute the processing logic 626 for performing the operations and steps discussed herein.

The computer system 600 may further include a network interface device 608 communicably coupled to a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-accessible storage medium 624 on which is stored software 626 embodying any one or more of the methodologies of functions described herein. The software 626 may also reside, completely or at least partially, within the main memory 604 as instructions 626 and/or within the processing device 602 as processing logic 626 during execution thereof by the computer system 600; the main memory 604 and the processing device 602 also constituting machine-accessible storage media.

The machine-readable storage medium 624 may also be used to store instructions 626 to implement an RMS component 110 to determine incident codes using a decision tree in a computer system, such as the computer system described with respect to FIG. 1, and/or a software library containing methods that call the above applications. While the machine-accessible storage medium 628 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The terms "first", "second", "third", "fourth", etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method, comprising:
   receiving, by a processing device, a request to create an incident report;
   building, by the processing device, a decision tree from decision tree data stored in a data storage device, wherein the decision tree comprises a plurality of incident codes and a plurality of incident attributes, and wherein the decision tree links one or more of the plurality of incident attributes to a leaf node comprising an incident code;
   generating, by the processing device, one or more questions pertaining to the one or more incident attributes of the decision tree;
   displaying, by the processing device, one or more answers corresponding to the one or more questions;
   utilizing, by the processing device, the one or more answers to traverse the decision tree to arrive at an additional question;
   determining, by the processing device, that the traversal of the decision tree results in an arrival at the leaf node comprising the incident code; and
   generating, by the processing device, the incident report using the determined incident code.

2. The method of claim 1, further comprising recalculating, by the processing device, the decision tree to compensate for questions that a user may not be able to answer.

3. The method of claim 1, further comprising:
   responsive to determining, by the processing device, that a traversal of the decision tree does not result in an arrival at an incident code, repeating, by the processing device, the generating, displaying, and utilizing until an incident code is produced or the tree produces an empty result.

4. The method of claim 1, wherein the decision tree comprises a tree-based data structure.

5. The method of claim 1, further comprising, prior to receiving the request:
   uploading, by a processing device, a spreadsheet comprising one or more incident attributes mapped to corresponding one or more codes;
   recursively selecting, by the processing device, a set of most important incident attributes corresponding to a set of codes from the spreadsheet using a divergence method to build a decision tree of incident attributes and codes; and
   determining, by the processing device, an order of incident attributes in the decision tree using machine learning to narrow down code combinations.

6. The method of claim 5, wherein the divergence method is a Kullback-Leibler divergence technique.

7. The method of claim 6, wherein the divergence method determines a most divisive incident attribute that gives a highest likelihood of discarding the largest number of non-matching codes.

8. The method of claim 5, wherein a first cell of each row in the spreadsheet represents a uniform or national code, a second cell represents a local code, a third cell represents a corresponding uniform or national code name, and a fourth cell represents a corresponding local code name.

9. The method of claim 5, wherein each column header in the spreadsheet represents an incident attribute.

10. The method of claim 5, wherein unique answers in each column of the spreadsheet become possible values for an incident attribute.

11. The method of claim 5, wherein each row in the spreadsheet is defined by a uniform/national code and a local code for an incident.

12. The method of claim 5, further comprising mapping a combination of local codes to a combination of uniform/national codes.

13. A system, comprising:
   a memory;
   a processing device, operatively coupled to the memory to:
      receive a request to create an incident report;
      build a decision tree from decision tree data stored in a data storage device, wherein the decision tree comprises a plurality of incident codes and a plurality of incident attributes, and wherein the decision tree links one or more of the plurality of incident attributes to a leaf node comprising an incident code;
      generate one or more questions pertaining to the one or more incident attributes of the decision tree;
      display one or more answers corresponding to the one or more questions;
      utilize the one or more answers to traverse the decision tree to arrive at an additional question;
      determine that the traversal of the decision tree results in an arrival at the leaf node comprising the incident code; and
      generate the incident report using the determined incident code.

14. The system of claim 13, wherein the processing device is further to recalculate the decision tree to compensate for questions that a user may not be able to answer.

15. The system of claim 13, wherein the processing device is further to:
   responsive to determining that a traversal of the decision tree does not result in an arrival at an incident code, repeating, by the processing device, the generating, displaying, and utilizing until an incident code is produced or the tree produces an empty result.

16. The system of claim 13, wherein the processing device is further to, prior to receiving the request:
upload a spreadsheet comprising traits mapped to codes;
recursively select a set of most important incident attributes corresponding to a set of codes from the spreadsheet using a divergence method to build a decision tree of incident attributes and codes; and
determine an order of incident attributes in the decision tree using machine learning to narrow down code combinations.

17. A non-transitory computer-readable medium storing instructions that when executed by a processing device, cause the processing device to:
receive a request to create an incident report;
build a decision tree from decision tree data stored in a data storage device, wherein the decision tree comprises a plurality of incident codes and a plurality of incident attributes, and wherein the decision tree links one or more of the plurality of incident attributes to a leaf node comprising an incident code;
generate one or more questions pertaining to the one or more incident attributes of the decision tree;
display one or more answers corresponding to the one or more questions;
utilize the one or more answers to traverse the decision tree to arrive at more questions;
determine that the traversal of the decision tree results in an arrival at the leaf node comprising the incident code; and
generate the incident report using the determined incident code.

18. The non-transitory computer-readable medium of claim 17, wherein the processing device is further to recalculate the decision tree to compensate for questions that a user may not be able to answer.

19. The non-transitory computer-readable medium of claim 17, wherein the processing device is further to:
responsive to determining that a traversal of the decision tree does not result an arrival at an incident code, repeating, by the processing device, the generating, displaying, and utilizing until an incident code is produced or the tree produces an empty result.

20. The non-transitory computer-readable medium of claim 17, wherein the processing device is further to, prior to receiving the request:
upload a spreadsheet comprising traits mapped to codes;
recursively select a set of most important incident attributes corresponding to a set of codes from the spreadsheet using a divergence method to build a decision tree of incident attributes and codes; and
determine an order of incident attributes in the decision tree using machine learning to narrow down code combinations.

* * * * *